United States Patent [19]
Yeany

[11] Patent Number: 5,659,210
[45] Date of Patent: Aug. 19, 1997

[54] EASILY CONSTRUCTIBLE INSTRUCTIONAL ELECTRIC MOTOR

[76] Inventor: Bruce Yeany, 636 W. Walnut St., Palmyra, Pa. 17078

[21] Appl. No.: 321,877

[22] Filed: Oct. 14, 1994

[51] Int. Cl.⁶ .................................................. G09B 23/18
[52] U.S. Cl. ............................... 310/1; 310/71; 310/177; 434/380
[58] Field of Search .................... 310/1, 71, 177, 310/179, 180, 233, 234; 434/380

[56] References Cited

U.S. PATENT DOCUMENTS

| | | | |
|---|---|---|---|
| 1,838,146 | 12/1931 | Klopsteg | 310/1 |
| 3,109,946 | 11/1963 | Pontin | 310/46 |
| 3,214,662 | 10/1965 | De Wolf | 318/129 |
| 3,644,809 | 2/1972 | Lahde | 318/138 |
| 3,678,310 | 7/1972 | Munn et al. | 310/40 MM |
| 3,794,824 | 2/1974 | Bacevius | 362/189 |
| 3,835,309 | 9/1974 | Witte et al. | 362/183 |
| 4,764,698 | 8/1988 | Murakami | 310/72 |
| 5,217,824 | 6/1993 | Womack | 429/96 |

OTHER PUBLICATIONS

Edwin P. Anderson and Rex Miller Electric Motors 1983 pp. 16–17, 40–43 month unknown.
John D. Kraus Electromagnetics Fourth Edition pp. 284–295 date unknown.
Instruction Book for Electro–magnetix 1991 Educational Design, Inc., pp. 2–3, 26–31 month unknown.

*Primary Examiner*—Steven L. Stephan
*Assistant Examiner*—Judson H. Jones
*Attorney, Agent, or Firm*—Robert E. Bushnell, Esq.

[57] ABSTRACT

A simple motor device for use as a learning tool includes a battery, a permanent magnet, an electrically conductive wire coil, a housing having an open bottom and parallel sidewalls to accommodate the battery, slotted grooves vertically traversing the sidewalls on an interior portion of the housing and forming openings at the top of the housing, E-shaped portions formed on both ends of the interior portion of the housing, and two specially adapted metallic supports that are positioned within their respective slotted grooves and extend through the openings on the top of the housing. One end of each metallic support contacts one end of the battery while the other end has an open yoke to electrically contact and support one end of the electrically conductive wire coil. A sub-housing portion of the housing is designed to accommodate the permanent magnet. The electrically conductive wire coil can rotate via the battery current running through it and the magnetic field produced from the permanent magnet. The motor of the present invention is securely held together once assembled due to specially adapted components.

21 Claims, 3 Drawing Sheets

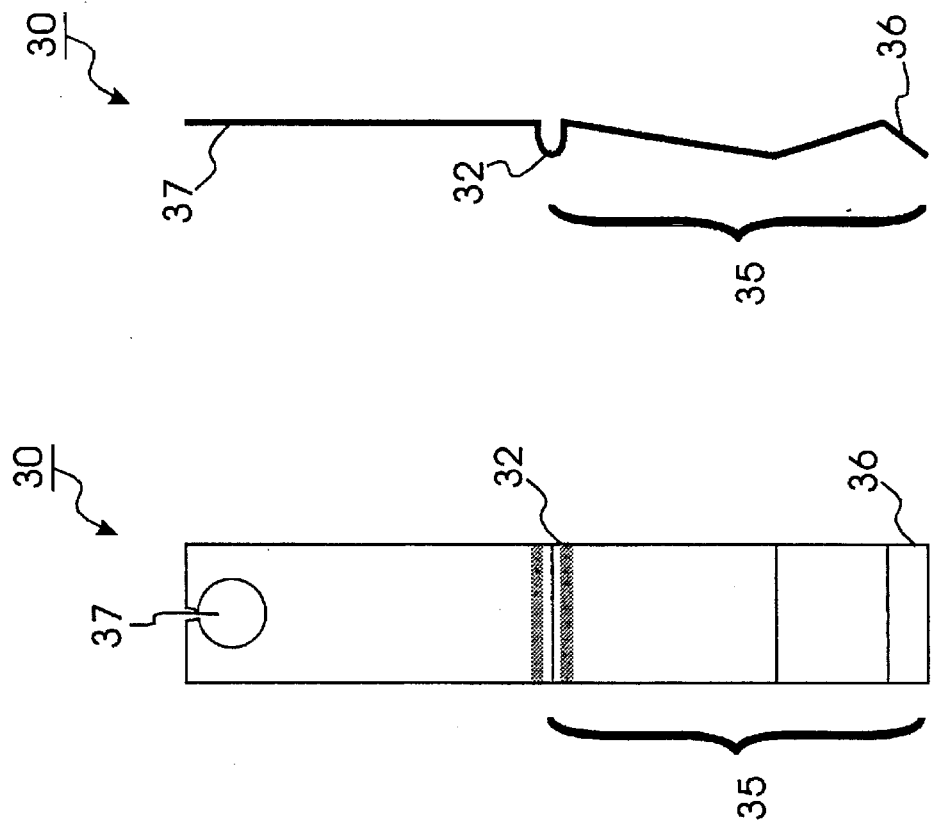
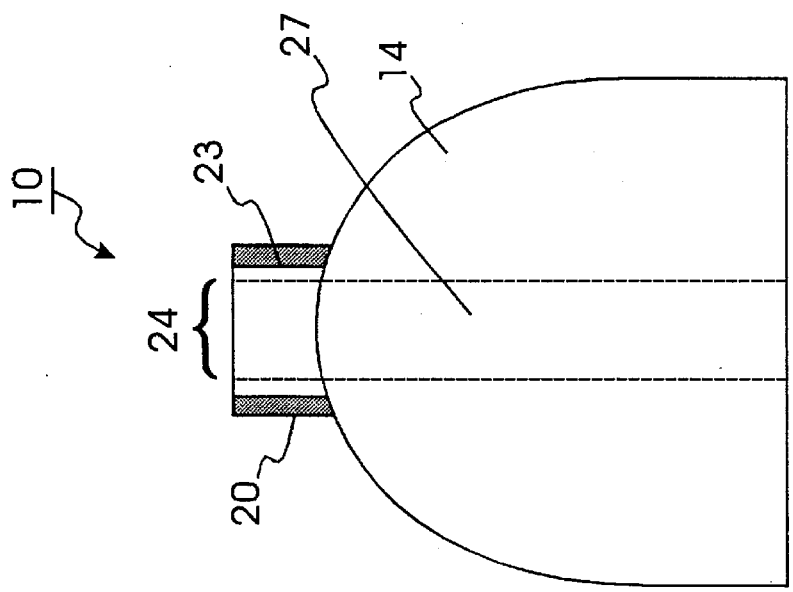
FIG. 7
FIG. 6
FIG. 5

EASILY CONSTRUCTIBLE INSTRUCTIONAL ELECTRIC MOTOR

BACKGROUND OF THE INVENTION

The present invention relates to a simple electric motor, and more particularly, to an electric motor that can be easily assembled from specially adapted components to provide a structurally secure arrangement that is extremely useful for illustrating basic concepts of electricity and electromagnetic field theory.

In the educational process, it is a well-established tenet that individuals are more prone to gasp and retain a particular concept if they are able to obtain an intuitive understanding of the basic principles underlying the concept. Such an intuitive understanding is often best achieved through use of one's visual sensory perception. This is particularly true in the study of science. For example, it may be difficult for a person to attain a practical understanding of the interaction of magnetic fields solely on the basis of vector diagrams presented in a textbook. Placement of magnets having opposite polarities in close proximity with each other shines a different light on the situation, thus giving students a more thorough and intuitive understanding of the textbook principles.

As a science teacher, it has been my experience that experiments such as the aforementioned one serve as invaluable learning tools. One specific concept that has been difficult to illustrate to students is that of an electric motor. This concept can be demonstrated by science kits that are currently on the market; one exemplary kit called *Electro-Magnetix*, is disclosed in an instruction book published by Educational Design, Inc. in 1991. With kits such as these, students can play games and perform tricks using an electromagnetic motor. This product, however, has several deficiencies that impede the demonstration of the underlying scientific principles. One primary deficiency is that motor structures constructed with these kits tend to be structurally insecure. That is, they can not be easily moved about or readily manipulated by the students during operation to display a functioning device. It can only be displayed to a very limited number of students at once. Moreover, such kits tend to rely upon an excessive number of component parts that are collectively expensive to manufacture and can be easily misplaced.

SUMMARY OF THE INVENTION

Accordingly, it is an object of the present invention to provide an improved simple motor;

It is another object to provide a simple motor that is capable of serving as an effective demonstrative visual aide;

It is still another object to provide a simple motor that can be easily assembled from preformed, specially adapted components;

It is yet another object to provide a simple motor that securely maintains assembly;

It is still yet another object to provide a simple motor that is inexpensive to manufacture in the form of a kit;

These and other objects of the present invention may be achieved according to the principles of the present invention with a permanent magnet, an electrically insulated conductive wire coil, a housing having an open bottom and parallel sidewalls to accommodate insertion and removal of a dry cell battery, slotted grooves vertically traversing the sidewalls on an interior portion of the housing and forming openings at the top of the housing, E-shaped portions formed on both ends of the interior portion of the housing, and two specially adapted metallic contacts that are positioned within their respective slotted grooves and extend through the openings on the top of the housing. One end of each metallic contacts engages a different pole of the battery while the other ends each provide an open yoke to electrically contact and support a corresponding end of the electrically insulated conductive wire coil. A sub-housing portion of the housing is designed to accommodate insertion of the permanent magnet. The electrically conductive wire coil can rotate via the battery current running through it and the magnetic field produced from the permanent magnet. The motor of the present invention is securely held together once assembled due, inter alia, to the leaf spring effects of the metallic contacts in cooperation with the other components of the kit.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 5 illustrates a side view of the housing used in the present invention;

FIG. 6 illustrates a front view of a metallic contact used in the present invention; and FIG. 7 illustrates a side view of the metallic contact used in the present invention.

DETAILED DESCRIPTION OF THE INVENTION

Figure 1:
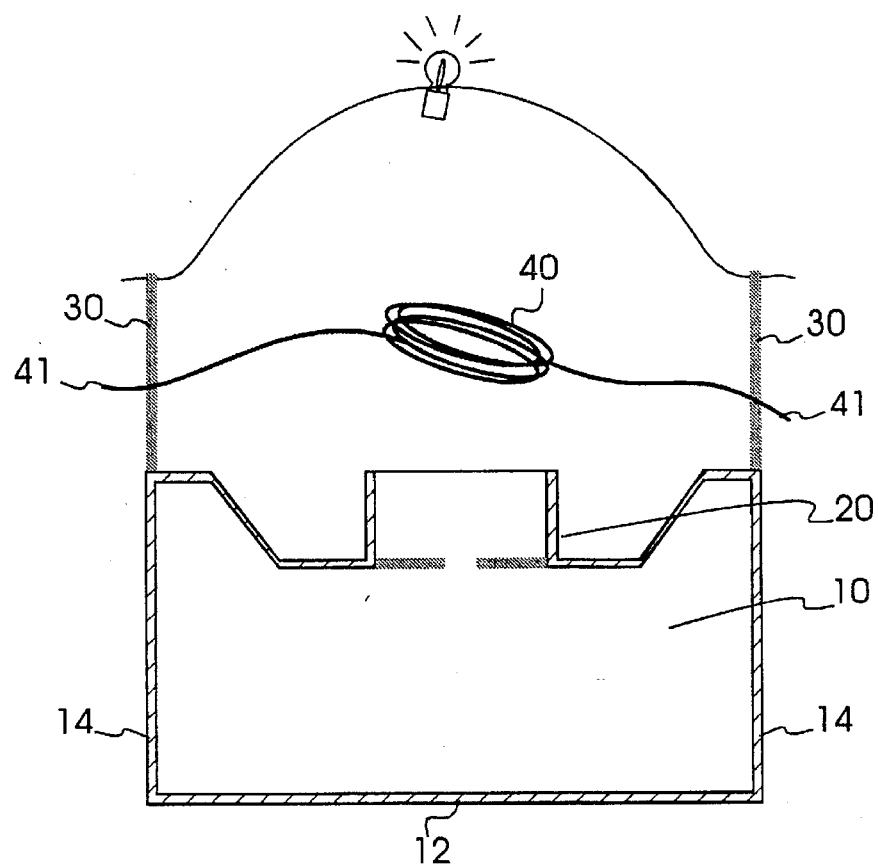
FIG. 1 illustrates the motor of the present invention in an assembled, operating state.

Turning now to the drawings, and referring to FIG. 1, a simple motor constructed according to the principles of the present invention is depicted. A housing 10 having an open bottom 12 and parallel sidewalls 14 is composed of an electrical insulating material (preferably plastic). The body of housing 10 has a parabolic shape (see FIG. 5) and is used to accommodate insertion of a dry cell battery 11 (see FIG. 2) which may be inserted within housing 10 through its open bottom 12. Housing 10 has a sub-housing 20 formed on a top center portion to securely accommodate a permanent magnet 21 (see FIG. 2). Along interior portions of right and left sidewalls 14 of housing 10, electrically conducting metallic (e.g., copper or tin) contacts 30 extend upwardly to support and electrically contact a coil 40 of a length of insulated wire which is rotatable about metallic contacts 30. Wire coil 40, which preferably has an outer electrically insulating covering of enamel and is wound into a circular loop-like shape, is electrically conductive. Opposite ends of the length of wire forming coil 40 extend radially outward on side portions 41 to engage metallic contacts 30. Wire coil 40 can be wound to have as many turns as the user may prefer, however, the outer insulating covering causes the wire coil 40 to have a torque placed upon it as though it has only a single turn (i.e. Magnetic Torque=NiAB(sinΘ)). It is also acknowledged that wire coil 40, rather than being constructed as a single loop, can be arranged from two or three concentric discrete lengths of wire to provide a corresponding number of coaxially extending, but arcuately displaced coils, thereby mimicking a two or three phase motor, respectively.

In the assembled, operating state shown in FIG. 1, electrical current supplied from the battery is conducted via one of the metallic contacts 30 through the circularly wound wire coil 40 to form a current loop. A magnetic field is induced about wire coil 40 as a result of the electrical current flow. Permanent magnet 21, which is securely positioned within sub-housing portion 20, produces a magnetic field which reacts with the magnetic field induced about wire coil 40, thereby applying a torque or rotational force upon wire coil 40 and causing it to rotate.

With the present invention, several electrical principles are capable of being demonstrated. For instance, one can remove the electrically insulating outer covering of enamel from approximately one half of the surface area on only the ends 41 of wire coil 40 extending outward to engage metallic contacts 30. By doing so, wire coil 40 conducts electrical current between metallic contacts 30 only during every half rotational cycle. If, during this time, lead wires are connected to top portions of metallic contacts 30 and run to a small light bulb (as shown in FIG. 1), the electrical current from battery 11 will flow in the path of least resistance and the small light bulb will become illuminated during the periods of time in which wire coil 40 is not conducting electrical current (i.e. the portion of the rotational cycle when the electrically insulating outer covering of wire coil 40 contacts metallic contacts 30).

Figure 2:
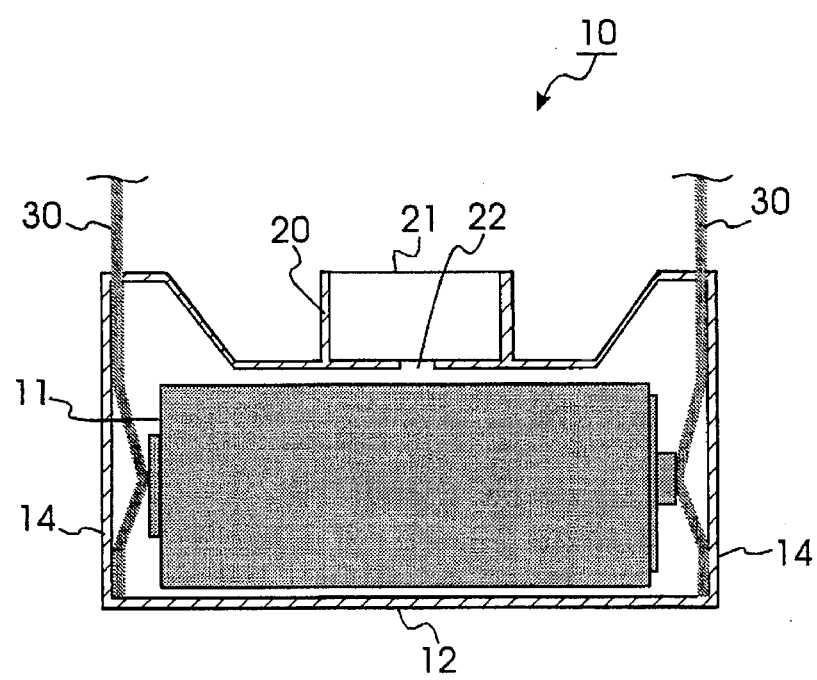
FIG. 2 illustrates a front cross-sectional view of a housing used in the present invention.

Referring now to FIG. 2, a from cross-sectional view of housing 10 is shown. Within housing 10, battery 11 is lodged to supply electrical current to the motor via metallic contacts 30. On the top center portion of housing 10, sub-housing 20 provides a circular cavity positioned equally between openings 24, and securely accommodates permanent magna 21. Just below permanent magnet 21, a through hole 22 which extends to the interior of housing 10 is formed. Through hole 22 serves to keep permanent magnet 21 assembled within sub-housing 20. That is, since the exterior covering of battery 11 is typically composed of a material (e.g. sheet steel or other iron based material) responsive to a magnetic material, through hole 22 provides a hollowed-out area where the magnetic field from permanent magnet 21 can form an attraction towards the exterior coating of battery 11. As a result, permanent magnet 21 (once installed) remains securely lodged within sub-housing 20.

Figure 3:
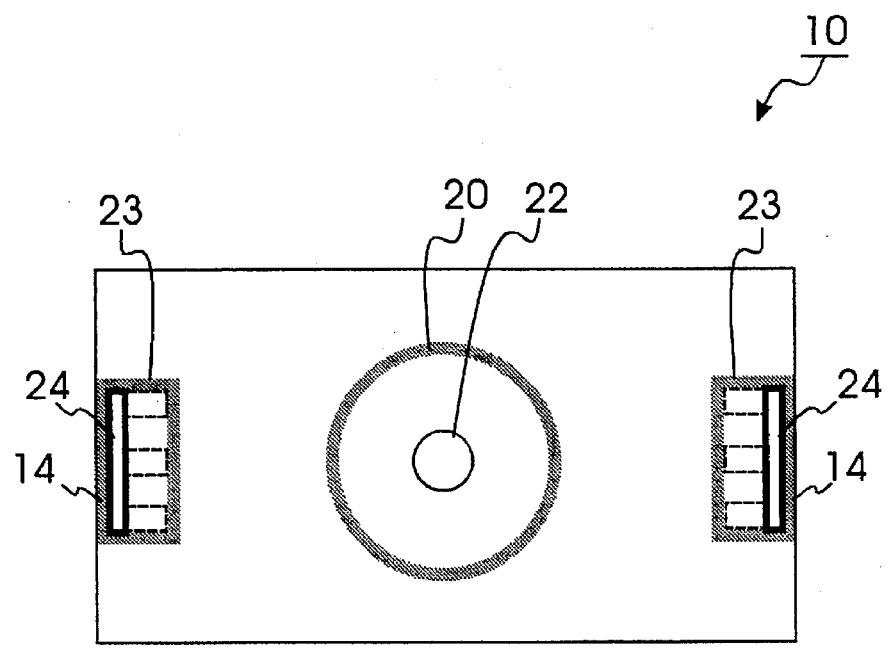
FIG. 3 illustrates a top view of the housing used in the present invention.

Referring to FIG. 3, a top view of housing 10 is shown. Sub-housing 20, which accommodates insertion of permanent magnet 21 and has through hole 22 formed on a lower portion, is depicted as having a circular outer shape. This design has been chosen only for use with circular magnets. That is, if a square or triangular magnet were used, the shape of sub-housing 20 would be chosen accordingly. On both ends of the top portion of housing 10, raised portions 23 are respectively formed. Each raised portion 23 has an opening 24 formed on an outer portion through which metallic contacts 30 extend.

Figure 4:
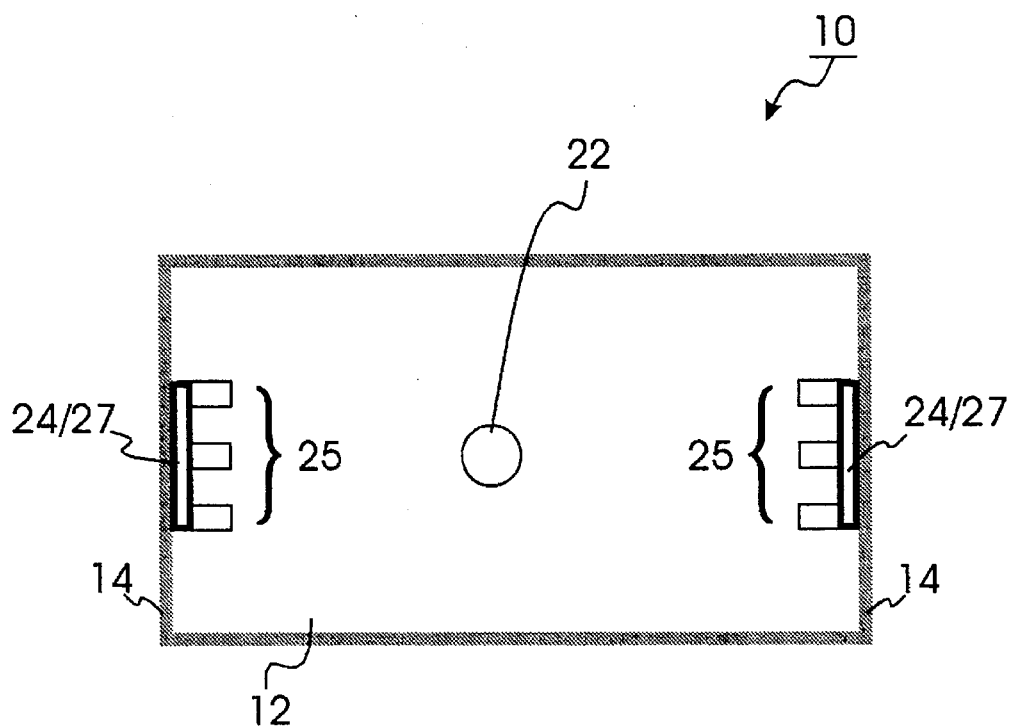
FIG. 4 illustrates a bottom view of the housing used in the present invention.

In FIG. 4, a bottom view of housing 10 is shown. E-shaped portions 25 are formed on both ends of the interior of housing 10. On an outer portion of each E-shaped portion 25, a slotted groove 27 is formed within the respective sidewall 14 of the interior of housing 10. Each slotted groove 27 extends through the top of housing 10 to form opening 24 in the top of housing 10. Assembly of metallic contacts 30 is achieved by (starting from the open bottom 12 of housing 10) placing each metallic contact 30 within a respective slotted groove 27, and inserting the metallic contact 30 upwardly through opening 24 in the top of housing 10 until movement is prohibited by engagement with the respective E-shaped portion 25.

Turning to FIG. 5, a side view of housing 10 is illustrated. As shown, the body of housing 10 has a parabolic shape to accommodate insertion of battery 11. Slotted groove 27 (indicated by the broken line) vertically traverses the sidewall 14 of housing 10 and extends through raised portion 23 to form opening 24.

In FIGS. 6 and 7, front and side views of the specially adapted metallic contacts 30 are shown, respectively. Referring to FIG. 6, we see that each metallic contact 30 has a strip-like appearance with a detent 32 positioned on a center portion. As stated above, this detent 32 engages with the respective E-shaped portion 25 of housing 10 to place metallic contact 30 in its optimal position. On a lower end of each metallic contact 30, a bowed portion 35 is formed to engage with its respective terminal of battery 11. These bowed portions 35, which flare inwardly towards each other, electrically contact and apply inward pressure upon the respective battery terminals in which they engage to keep battery 11 securely installed within housing 10; even if housing 10 is lifted off the ground and gravity acts upon the battery 11. Metallic contacts 30, when properly installed with battery 11 in place, are positioned such that a lower section 36 of each bowed portion 35 is firmly engaged within the respective slotted groove 27 of housing 10.

Bowed portion 35 of metallic contact 30 is more clearly seen in FIG. 7. On an upper end of each metallic contact 30, a yoke 37 having an open top portion is provided to electrically contact and support the respective side 41 of wire coil 40. The open top portion is important since it enables a user to easily place the sides 41 of wire coil 40 within yoke 37. To initiate operation of the motor once it is assembled, one need only rotate wire coil 40 a half revolution and then release the coil to the field created by current from the battery flowing, through the several insulated rams of coil 40 (during each half-cycle) while the uninsulated portions of leads 41 make electrical contact with metallic contacts 30.

While there have been illustrated and described what are considered to be a preferred embodiment of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A motor device, comprising:
    a permanent magnet;
    an electrically conductive wire coil with first and second terminal end portions extending radially away in mutually opposed directions from a center of said electrically conductive wire coil;
    housing means for accommodating a battery, said housing means having an open bottom and first and second parallel sidewalls;

sub-housing means positioned on a top center portion of said housing means for accommodating insertion of the permanent magnet;

first and second slotted grooves respectively formed within said first and second parallel sidewalls on an interior portion of said housing means, said first and second slotted grooves vertically traversing said first and second parallel sidewalls and forming first and second openings on a top portion of said housing means, respectively;

first and second contact portions respectively formed on first and second ends of said interior portion of said housing means;

a first electrically conducting contact installed within said first slotted groove and extending through said first opening on said top portion of said housing means, said first electrically conducting contact comprising a first detent positioned at a center portion to engage said first contact portion, a first bowed portion positioned on a first end of said first electrically conducting contact to engage a first terminal of the battery accommodated within said housing means, and a first yoke having an open top portion positioned on a second end of said first electrically conducting contact opposite to said first end of said first electrically conducting contact to electrically contact and support said first terminal end portion of said electrically conductive wire coil; and a second electrically conducting contact installed within said second slotted groove and extending through said second opening on said top portion of said housing means, said second electrically conducting contact comprising a second detent positioned at a center portion to engage said second contact portion, a second bowed portion positioned on a first end of said second electrically conducting contact to engage a second terminal of the battery accommodated within said housing means, and a second yoke having an open top portion positioned on a second end of said second electrically conducting contact opposite to said first end of said second electrically conducting contact to electrically contact and support said second terminal end portion of said electrically conductive wire coil.

2. The motor device as claimed in claim 1, further comprised of said sub-housing means of said housing means having a through hole positioned on a bottom portion, said hole extending into said interior portion of said housing means and providing an air gap between the permanent magnet and an exterior coating of any battery accommodated within said housing means.

3. The motor device as claimed in claim 2, further comprised of said sub-housing means having a conforming shape to accommodate insertion of the permanent magnet.

4. The motor device as claimed in claim 2, further comprised of said first and second contact portions each exhibiting an E-shape.

5. The motor device as claimed in claim 1, further comprised of said first and second terminal end portions of said electrically conductive wire coil being partially coated with an electrical insulator.

6. The motor device as claimed in claim 1, further comprised of the battery being retained within said housing means by pressure exerted upon the battery from said first and second bowed portions of said first and second electrically conductive contacts, respectively.

7. The motor device as claimed in claim 1, further comprised of first and second raised portions respectively formed on first and second ends of said top portion of said housing means, said first and second openings being respectively formed in said first and second raised portions.

8. The motor device as claimed in claim 1, further comprised of said housing means having a parabolic shaped body wherein the battery is insertable within said housing means through said open bottom.

9. A motor device, comprising:

an electrically conductive wire coil with first and second terminal end portions extending radially away in mutually opposing directions from a center of said electrically conductive wire coil;

housing means for accommodating insertion of a battery, said housing means having an open bottom and first and second parallel sidewalls;

first and second contact portions respectively formed on first and second ends of an interior portion of said housing means;

first and second slotted grooves respectively formed within said first and second parallel sidewalls on an interior portion of said housing means, said first and second slotted grooves vertically traversing said first and second parallel sidewalls and forming first and second openings on a top portion of said housing means, respectively;

a first metallic support installed within said first slotted groove and extending through said first opening on said top portion of said housing means, said first metallic support comprising a first detent positioned at a center portion to engage said first contact portion, a first bowed portion positioned on a first end of said first metallic support to engage a first terminal of the battery accommodated within said housing means, and a first yoke having an open top portion positioned on a second end of said first metallic support opposite to said first end of said first metallic support to support and electrically contact said first terminal end portion of said electrically conductive wire coil; and a second metallic support installed within said second slotted groove and extending through said second opening on said top portion of said housing means, said second metallic support comprising a second detent positioned at a center portion to engage said second contact portion, a second bowed portion positioned on a first end of said second metallic support to engage a second terminal of the battery accommodated within said housing means, and a second yoke having an open top portion positioned on a second end of said second metallic support opposite to said first end of said second metallic support to electrically contact and support said second terminal end portion of said electrically conductive wire coil.

10. The motor device as claimed in claim 9, further comprising sub-housing means positioned between said first metallic support and said second metallic support, on a top center portion of said housing means for accommodating insertion of a magnet.

11. The motor device as claimed in claim 10, further comprised of said sub-housing means having a through hole positioned on a bottom portion of said sub-housing means to extend into said interior portion of said housing means and providing an air gap between the magnet and an exterior coating of any battery accommodated within said housing means.

12. The motor device as claimed in claim 11, further comprised of said first and second contact portions each exhibiting an E-shape.

13. The motor device as claimed in claim 10, further comprised of said sub-housing means having a conforming shape to accommodate insertion of the magnet.

14. The motor device as claimed in claim 9, further comprised of said first and second terminal end portions of said electrically conductive wire coil being partially coated with enamel on an outer surface.

15. The motor device as claimed in claim 9, further comprised of said housing means having a parabolic shaped body accommodating insertion of the battery within said housing means through said open bottom, the battery being retained within said housing means by pressure exerted upon the battery from said first and second bowed portions of said first and second metallic supports, respectively.

16. The motor device as claimed in claim 9, further comprised of first and second raised portions respectively formed on first and second ends of said top portion of said housing means, said first and second openings being respectively formed in said first and second raised portions.

17. A motor device, comprising:
an electrically conductive wire coil with first and second terminal end portions extending in mutually opposing directions radially away from a center of said electrically conductive wire coil;
housing means for accommodating a battery, said housing means having an open bottom and first and second parallel sidewalls;
first and second slotted grooves respectively formed within said first and second parallel sidewalls on an interior portion of said housing means, said first and second slotted grooves vertically traversing said first and second parallel sidewalls and forming first and second openings on a top portion of said housing means, respectively;
a first metallic contact installed within said first slotted groove and extending through said first opening on said top portion of said housing means, said first metallic contact comprising a first detent positioned at a center portion to engage within said interior portion of said housing, a first bowed portion positioned on a first end of said first metallic contact to engage a first terminal of the battery accommodated within said housing means, and a first yoke having an open top portion positioned on a second end of said first metallic contact opposite to said first end of said first metallic contact to support and electrically contact said first terminal end portion of said electrically conductive wire coil; and
a second metallic contact installed within said second slotted groove and extending through said second opening on said top portion of said housing means, said second metallic contact comprising a second detent positioned at a center portion to engage within said interior portion of said housing, a second bowed portion positioned on a first end of said second metallic contact to engage a second terminal of the battery accommodated within said housing means, and a second yoke having an open top portion positioned on a second end of said second metallic contact opposite to said first end of said second metallic contact to electrically contact and support said second terminal end portion of said electrically conductive wire coil.

18. The motor device as claimed in claim 17, further comprising first and second E-shaped portions respectively formed on first and second ends of said interior portion of said housing means to engage said first and second detents, respectively.

19. The motor device as claimed in claim 17, further comprising sub-housing means positioned on a top center portion of said housing means for accommodating insertion of a magnet, said sub-housing means having a through hole positioned on a bottom portion that extends into said interior portion of said housing means and providing an air gap between the magnet and an exterior coating of the battery.

20. The motor device as claimed in claim 17, further comprised of said electrically conductive wire coil being coated with an electrically insulating material on an outer surface, said electrically insulating material being removed from one-half of said outer surface on outer end portions of said electrically conductive wire coil to enable said electrically conductive wire coil to conduct electricity only during a half-rotational cycle.

21. An assembly for an electric motor, comprising:
an electrically conductive wire coil with first and second terminal end portions extending radially away in mutually opposed directions from a center of said electrically conductive wire coil;
housing means having an interior for accommodating a battery, said housing means having first and second parallel sidewalls and an orifice accommodating admission of the battery into said interior;
sub-housing means positioned on a top center portion of said housing means for accommodating insertion of a permanent magnet;
first and second slotted grooves respectively formed within said first and second parallel sidewalls on an interior portion of said housing means, said first and second slotted grooves vertically traversing said first and second parallel sidewalls and forming first and second openings on a top portion of said housing means, respectively;
first and second contact portions respectively formed on first and second ends of said interior portion of said housing means;
a first electrically conducting contact installed within said first slotted groove and extending through said first opening on said top portion of said housing means, said first electrically conducting contact comprising a first detent positioned at a center portion to engage said first contact portion, a first bowed portion positioned on a first end of said first electrically conducting contact to engage a first terminal of the battery accommodated within said housing means, and a first yoke having an open top portion positioned on a second end of said first electrically conducting contact opposite to said first end of said first electrically conducting contact to electrically contact and support said first terminal end portion of said electrically conductive wire coil; and
a second electrically conducting contact installed within said second slotted groove and extending through said second opening on said top portion of said housing means, said second electrically conducting contact comprising a second detent positioned at a center portion to engage said second contact portion, a second bowed portion positioned on a first end of said second electrically conducting contact to engage a second terminal of the battery accommodated within said housing means, and a second yoke having an open top portion positioned on a second end of said second electrically conducting contact opposite to said first end of said second electrically conducting contact to electrically contact and support said second terminal end portion of said electrically conductive wire coil.

* * * * *